United States Patent
Madsen et al.

(10) Patent No.: US 10,176,065 B2
(45) Date of Patent: Jan. 8, 2019

(54) INTELLIGENT FAILURE PREDICTION AND REDUNDANCY MANAGEMENT IN A DATA STORAGE SYSTEM

(71) Applicant: SEAGATE TECHNOLOGY LLC, Cupertino, CA (US)

(72) Inventors: Christian Bruun Madsen, Longmont, CO (US); Andrei Khurshudov, Niwot, CO (US); Zachary Alexander, Snoqualmie, WA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 227 days.

(21) Appl. No.: 14/623,415

(22) Filed: Feb. 16, 2015

(65) Prior Publication Data

US 2016/0239395 A1    Aug. 18, 2016

(51) Int. Cl.
| | |
|---|---|
| *G06F 11/00* | (2006.01) |
| *G06F 11/20* | (2006.01) |
| *G06F 11/30* | (2006.01) |
| *G06F 11/34* | (2006.01) |

(52) U.S. Cl.
CPC .......... *G06F 11/2069* (2013.01); *G06F 11/00* (2013.01); *G06F 11/2082* (2013.01); *G06F 11/3034* (2013.01); *G06F 11/3409* (2013.01); *G06F 2201/84* (2013.01)

(58) Field of Classification Search
CPC .......... G06F 11/2069; G06F 11/2082
See application file for complete search history.

(56) References Cited

U.S. PATENT DOCUMENTS

| | | | | |
|---|---|---|---|---|
| 7,533,330 | B2 * | 5/2009 | Anderson | G11B 20/1833 714/48 |
| 8,116,075 | B2 | 2/2012 | Hall et al. | |
| 8,185,784 | B2 | 5/2012 | McCombs et al. | |
| 9,268,657 | B1 * | 2/2016 | Horn | G06F 11/2084 |
| 2010/0274762 | A1 * | 10/2010 | Murphy | G06F 11/1446 707/636 |
| 2013/0262921 | A1 | 10/2013 | Gao et al. | |
| 2014/0136903 | A1 | 5/2014 | Hyde et al. | |
| 2015/0026517 | A1 * | 1/2015 | Ben Romdhane | G06F 11/1458 714/15 |

\* cited by examiner

*Primary Examiner* — Bryce P Bonzo
*Assistant Examiner* — Katherine Lin
(74) *Attorney, Agent, or Firm* — Holland & Hart LLP

(57) ABSTRACT

Methods, apparatuses, systems, and devices are described for redundancy management for a storage system including a plurality of storage devices. Approaches for redundancy management may involve storage device failure prediction techniques and/or a redundancy value associated with a data file. In one example, a copy of the file may be stored on at least two storage devices. Whether or not to store an additional copy of the file on another storage device may be based at least in part on the redundancy value for the file. In another example, a determination may be made whether to store a copy of the file on another storage device when a storage device storing a copy of the file is predicted to fail. Whether to store a copy of the file on another storage device may be based at least in part on a redundancy value associated with the file.

14 Claims, 11 Drawing Sheets

Time = $T_0$

Time = $T_1$ — Predict failure of 610-2. Determine RV for 655 with predicted failure: RV = 2 (or 33%). Compare determined RV for 655 with $RV_{TH}$: $RV_{TH}$ = 2 (or 16.7-33%). => RV >/= $RV_{TH}$ Time = $T_2$ Time = $T_0$ Time = $T_1$ Predict failure of 710-1. Determine RV for 755 with predicted failure: $RV_{755} = 1$ (or 16.7%). Compare determined $RV_{755}$ with $RV_{TH}$: $RV_{TH} = 2$ (or 16.7-33%). $=> RV_{755} < RV_{TH}$
Determine RV for 760 with predicted failure: $RV_{760} = 2$ (or 33%). Compare determined $RV_{760}$ with $RV_{TH}$: $RV_{TH} = 2$ (or 16.7-33%). $=> RV_{760} >/= RV_{TH}$ Time = $T_2$

INTELLIGENT FAILURE PREDICTION AND REDUNDANCY MANAGEMENT IN A DATA STORAGE SYSTEM

SUMMARY

The described features generally relate to one or more improved systems, methods, and/or apparatuses for managing redundancy in a data storage system. More particularly, the described features relate to techniques that may leverage drive failure prediction technologies to enhance redundancy management.

A method is described. The method may provide redundancy management for a data storage system including a plurality of storage devices. According to one implementation, the method may involve storing a copy of a file on a subset of the plurality of storage devices, the subset including at least two healthy storage devices of the plurality of storage devices. The method includes predicting whether a storage device of the subset is going to fail. Based at least in part on a redundancy value for the file, whether to store a copy of the file on another healthy storage device of the plurality of storage devices may be determined. The method may include these and/or other operations described herein.

A system is described. According to one implementation, the system may include a data storage system including a plurality of storage devices; and, at least one processor. The processor may be configured to store a copy of a file on a subset of the plurality of storage devices. The subset may include at least two healthy storage devices of the plurality of storage devices. The processor also may be configured to determine whether to store a copy of the file on another healthy storage device of the plurality of storage devices based at least in part on a redundancy value for the file. The system may include these and/or other elements configured to carry out various operations described herein.

An apparatus is also described. The apparatus may include various elements, such as described herein, that are configured to carry out various operations described herein.

A non-transitory computer-readable medium is described. The medium may store computer-executable code for redundancy management. The code may be executable by a processor to cause a device to: store a copy of a file on a subset of a plurality of storage devices of a storage system, the subset including at least two healthy storage devices of the plurality of storage devices; predict that a storage device of the subset is going to fail; determine a redundancy value corresponding to a number of copies of the file stored healthy storage devices of the subset that are not predicted to fail; compare the determined redundancy value to a threshold redundancy value; and, based at least in part on the comparing, store a copy of the file on a healthy storage device of the plurality of storage devices that does not have a copy of the file stored thereon. The code also may be executable to carry out various operations described herein.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
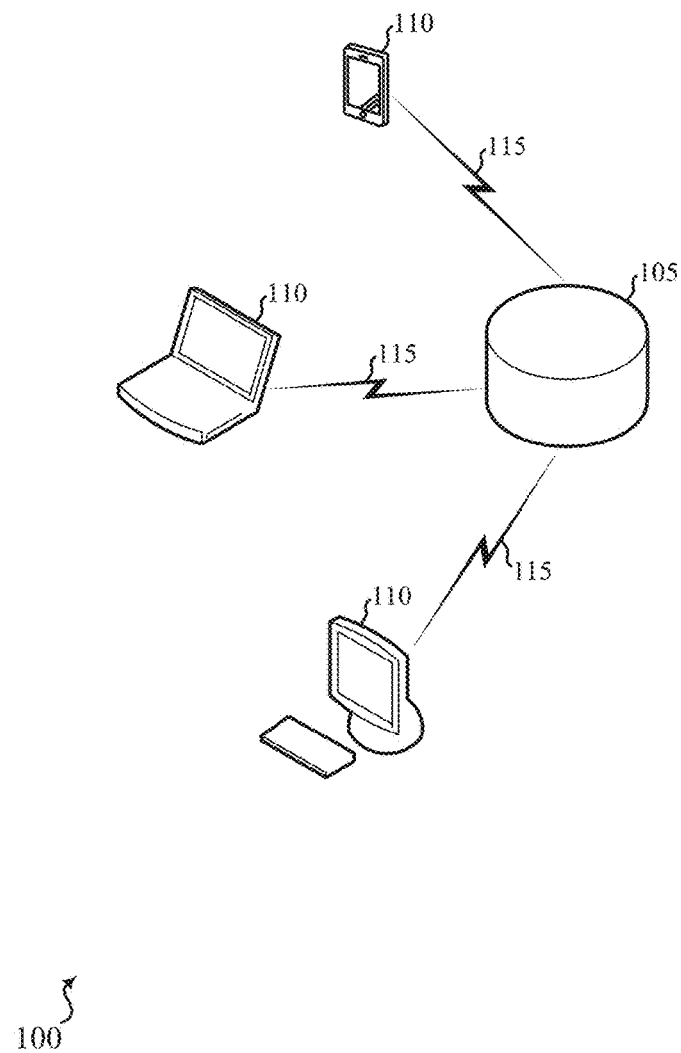
FIG. 1 is a block diagram of a computing system, in accordance with various embodiments.

The following relates generally to redundancy management for a storage system including a plurality of storage devices, and more specifically to redundancy management that that takes into account storage device failure prediction and/or a redundancy value associated with a data file.

Redundancy management is an important aspect of data storage to avoid loss of data. Various storage systems exist that employ a plurality of storage devices (e.g., a disk drive, a server, a solid-state device, etc.), not only to allow storage and access to more data, but also to backup data by storing more than one copy of files. For example, redundant arrays of independent disks (RAIDs) are well known.

Approaches described herein may involve storing (e.g., writing) multiple copies of a file that needs to be stored. The multiple copies of the file are stored on different storage devices, either co-located or at different geographical locations, to provide redundancy. Some examples may involve erasure coding in which data is broken into fragments, expanded and encoded with redundant data pieces and stored across a set of different storage devices. In some examples, approaches described herein may be implemented by a server running an application for management of files across multiple storage devices.

Approaches described herein may allow redundancy of an individual data file stored in a storage system to be managed storage based at least in part on a redundancy value (RV) associated with the data file. The redundancy value may be defined as a value that reflects a number of copies of the file on different storage devices. For example, the redundancy value may be a whole number (e.g., number of storage devices storing the file) or a fraction or percentage (e.g., number of storage devices storing the file/total number of storage devices in the storage system). The redundancy value for a file may take into account failing or failed storage devices storing a copy of the file, as well as storage devices storing a copy of the file that are predicted to fail. Such storage devices may be considered to be unhealthy, and may not be counted toward the redundancy value for the file because the copy of the filed stored thereon may not be retrievable, either currently or in the near future.

Whether or not to store an additional copy of the file on another storage device may be based at least in part on the redundancy value for the file. With such an approach, the redundancy value for the file may be set based at least in part on an importance of the file. Further, the redundancy value for the file may be set based at least in part on reliability of the storage devices and/or the overall reliability of the storage system including the storage devices.

Approaches described herein may employ a threshold redundancy value ($RV_{TH}$) associated with the data file. A current redundancy value for the file may be determined and compared to the threshold redundancy value for the file. Based at least in part on a result of the comparison, whether a copy of the file should be stored on another storage device of the storage system may be determined.

Approaches described herein also may employ storage device failure prediction. As noted above, techniques described herein may leverage drive failure prediction technologies to enhance redundancy management. Any manner of predicting failure of a storage device may be used, such as, self-monitoring, analysis and reporting technology (SMART) or the like. Thus, any known or hereafter developed techniques for predicting failure of a storage device (e.g., a hard disk drive (HDD), etc.) may be employed to implement the approaches described herein. Storage devices also may include solid state devices (SSDs), flash modules or drives, hybrid drives, optical drives, or any other known or hereafter developed mechanism designed to store data.

With copies of a file storage on multiple storage devices, a determination may be made whether to store a copy of the file on another storage device when a storage device storing a copy of the file is predicted to fail. Storage devices predicted to fail or already failed may be considered to be unhealthy storage devices. In one example, whether to store a copy of the file on another storage device may be based at least in part on a redundancy value associated with the file. If there are a sufficient number of different healthy storage devices storing copies of the file, then no action may be needed for the file. Otherwise, the decision may be to store a copy of the file on an additional storage device to meet or exceed the redundancy value for the file.

Although the approaches are described with respect to an individual file, it should be understood that the approaches may be applied to multiple files. For example, different files may have a same threshold redundancy value or may have different threshold redundancy values. Further, files may be grouped together, as appropriate or desired, with copies of the files stored as a group on individual storage devices. Each file of the group may have a same threshold redundancy value such that the group has that threshold redundancy value. Determining a current redundancy value for one file of the group may determine the current redundancy value for the group (e.g., all files of the group). Files may be grouped together, for example, when the data of the files are related and may be considered to have a common level of importance.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram of a computing system 100 in accordance with various aspects of the present disclosure is shown. The computing system 100 may include a database or data storage device 105, such as a disk drive.

The computing system 100 may be a distributed system in which multiple computing devices 110 may access data stored on the data storage device 105 and/or store (e.g., write) data on the data storage device 105. As such, the computing system 100 may be an enterprise system employing centralized data storage, or may be an example of unrelated computing devices 110 employing remote data storage (e.g., "the cloud").

Thus, each of the computing devices 110 may communicate, via a respective communication link 115, with the data storage device 105 to access data (e.g., read or write). The communication links 115 may be wireless (e.g., employing various radio access technologies), as appropriate or desired. Although wireless communication links 115 are illustrated in FIG. 1, it should be understood that wired communication links are possible as well.

Each of the computing devices 110 may be, for example, a laptop computer, a notebook computer, a netbook computer, a tablet computer, a smartphone, or the like. Thus, according to some aspects, the computing devices 110 may be portable or mobile. Additionally or alternatively, each of the computing devices 110 may be, for example, a desktop computer, a mainframe computer, or the like.

Although not illustrated in FIG. 1 for the sake of simplicity, the database/data storage device 105 may be a plurality of storage devices forming a storage system for the computing system 100. In such case, the data storage device 105 may employ some level of file redundancy to help prevent loss of data. The file redundancy may be managed at the data storage device 105, such as described herein.

Figure 2:
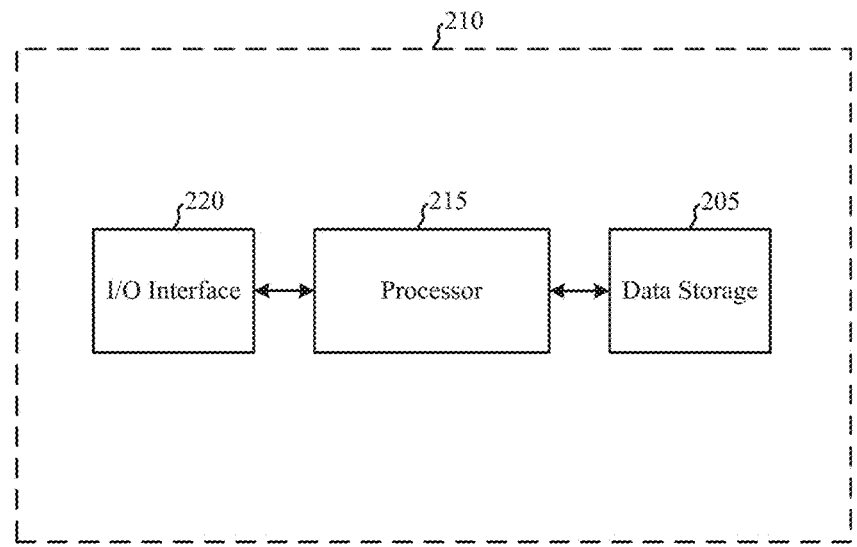
FIG. 2 is a block diagram of a computing device, in accordance with various embodiments.

FIG. 2 shows a block diagram that illustrates an example of computing device 210, in accordance with various aspects of the present disclosure. The computing device 210 may be an example of the computing devices 110 described above with respect to FIG. 1, for example. According to this example, the computing device 210 may include a data storage drive 205, such as a disk drive, solid state devices (SSDs), flash modules or drives, hybrid drives, optical drives, or any other known or hereafter developed mechanism designed to store data. The computing device 210 also may include a processor 215 configured to access (e.g., read/write) data on the data storage drive 205. The computing device 210 further may include an input/output (I/O) interface 220, such as a keyboard, a mouse, a touchscreen, or the like, that is configured to cause the processor 215 to access data on the data storage drive 205. It should be understood, however, that some instances of data access may be performed by the processor 215 without receiving a command from the I/O interface 220.

Although not illustrated in FIG. 2 for the sake of simplicity, the data storage device 205 may be a plurality of storage devices forming a storage system for the computing device 210. In such case, the data storage device 205 may employ some level of file redundancy to help prevent loss of data. The file redundancy may be managed by the processor 215 and/or the data storage drive 205, which may implement various aspects of the approaches described herein.

Figure 3A:
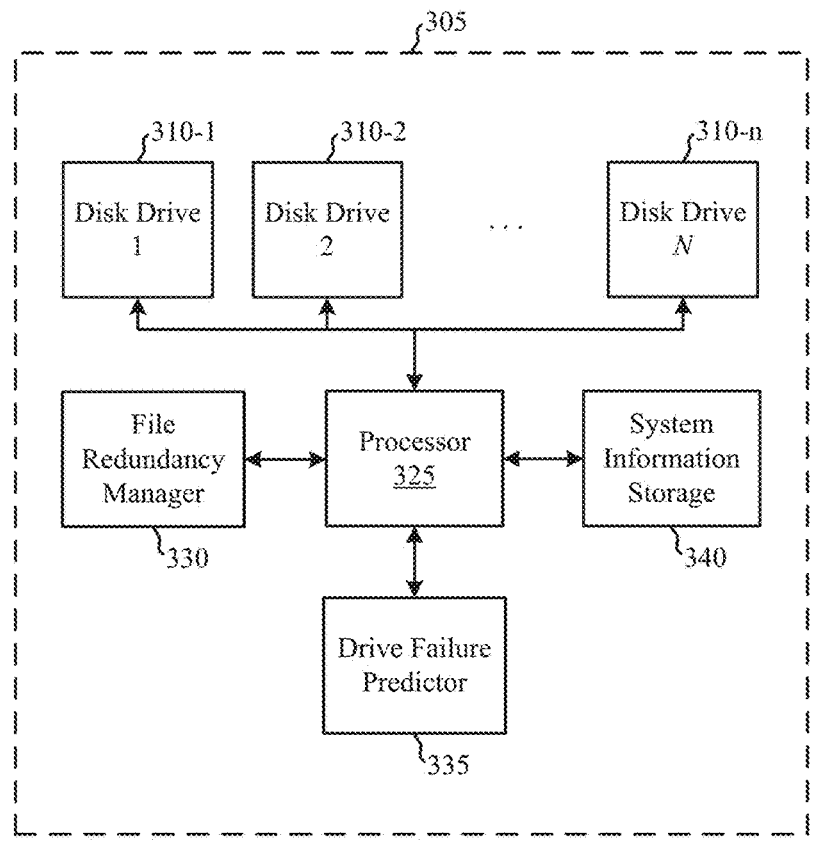
FIG. 3A is a block diagram of a data storage system, in accordance with various embodiments.

FIG. 3A shows a block diagram that illustrates an example of a data storage system 305, in accordance with various aspects of the present disclosure. The data storage system 305 may be an example of the data storage device 105 described above with respect to FIG. 1 or the data storage device 205 described above with respect to FIG. 2, for example.

The data storage system 305 may include a plurality (N) of disk drives 310-1, 310-2 . . . 310-n (or other data storage devices). The data storage system 305 also may include a processor 325, a file redundancy manager 330, a drive failure predictor 335 and a system information storage 340.

Data on the data storage system 305 (e.g., on the disk drives 310-1 . . . 310-n) may be accessed (e.g., read/written) by a processor of a computing device (not shown). The data may be accessed via communication with the processor 325 of the data storage system 305, or directly from/to each of the disk drives 310-1 . . . 310-n. In either case, when a data file is stored on the data storage system 305, copies of the file may be stored on two or more of the disk drives 310-1 . . . 310-n for redundancy.

In some examples, the file redundancy manager 330 may determine a threshold redundancy value for the file. Such determination may be made by receiving (e.g., via the processor 325) a pre-set threshold redundancy value for the file from the computing device (not shown) sending the file to the storage system 305 for storage. Alternatively or additionally, the threshold redundancy value for the file may be set as an initial value (either by the computing device or by the storage system 305), which may be adjusted over time as the file is accessed (e.g., a more frequently accessed file may be given a higher redundancy value, for example, to reflect its importance). The initial value may or may not be a minimum threshold redundancy value. For example, the file redundancy manager 330 may only be able to increase the threshold redundancy value for a file in accordance with accesses to the file. Alternatively, file redundancy manager 330 may be able to decrease the threshold redundancy value for a file as time elapses without the file being accessed, for example.

Based at least in part on the threshold redundancy value for the file, the file redundancy manager 330 may determine how many of the disk drives 310-1 . . . 310-n should have a copy of the file stored thereon. For example, when the data storage system 305 receives a file to be stored, the processor 325 may initially store a copy of the file on one of the disk drives 310-1 . . . 310-n. The processor 325 may select which one of the disk drives 310-1 . . . 310-n in any suitable manner, such as randomly or based on drive type, drive capacity, drive speed, available space, related file(s) already stored, etc. The file redundancy manager 330 may then communicate, based at least in part on the threshold redundancy value for the file, to the processor 325 how many additional copies of the file should be stored on separate ones of the disk drives 310-1 . . . 310-n. For example, the threshold redundancy value for the file may indicate that a copy of the file should be stored on at least two of the disk drives 310-1 . . . 310-n such that the processor 325 stores another copy of the file on a different one of the disk drives 310-1 . . . 310-n than was selected for initial storage of the file. In other examples, the processor 325 may initially store a copy of the file on multiple ones of the disk drives 310-1 . . . 310-n, and then increase or decrease the number of drives on which a copy of the file is stored based at least in part on the threshold redundancy value for the file.

In some examples, the drive failure predictor 335 may monitor each of the disk drives 310-1 . . . 310-n. Such monitoring may include various metrics of the disk drives 310-1 . . . 310-n in accordance with a particular failure prediction technology employed by the drive failure predictor 335. As discussed above, any suitable failure prediction technology may be used, and a detailed discussion of a particular failure prediction technology is omitted for the sake of brevity.

When the drive failure predictor 335 determines or identifies (e.g., predicts) that one of the disk drives 310-1 . . . 310-n is going to fail, the drive failure predictor 335 may notify the processor 325. The processor 325 may identify which files are stored on the disk drive that is predicted to fail. When a copy of the file under consideration is stored on the disk drive that is predicted to fail, the processor 325 may inform the file redundancy manager 330 so that the file redundancy manager 330 may determine whether loss of that copy would change the redundancy value for the file to be less than the threshold redundancy value for the file. If so, the file redundancy manager 330 may determine that a copy of the file should be stored on another healthy drive of the disk drives 310-1 . . . 310-n that does not already have a copy of the file stored thereon, and may inform the processor 325 to do so. Because the number of disk drives storing a copy of the file (before failure of the one of the disk drives 310-1 . . . 310-n storing a copy of the file was predicted) yielded a current redundancy value for the file that satisfied (e.g., met or exceeded) the threshold redundancy value, storing a copy of the file on another healthy drive of the disk drives 310-1 . . . 310-n that does not already have a copy of the file stored thereon will help ensure that the desired redundancy level for the file is maintained once the identified drive actually fails.

Thus, the file redundancy manager 330 may be configured to compute or otherwise determine (e.g., in conjunction with the processor 305) a current redundancy value for the file. The file redundancy manager 330 may determine the current redundancy value for the file periodically or on an as needed basis, such as upon occurrence of an event. If done periodically, a most recently determined redundancy value for the file may be used when one of the drives having a copy of the file stored thereon is predicted to fail. As discussed above, the event that triggers the file redundancy manager 330 to determine the current redundancy value for the file may be a predicted failure of one of the disk drives 310-1 . . . 310-n. Alternatively or additionally, the event may be an update to the threshold redundancy value for the file, whether the update is determined by the storage system 305 (e.g., such as described above) or externally (e.g., by a computing device using the storage system 305).

The processor 325 may save the threshold redundancy value for the file in the system information storage 330. The processor 325 may update the threshold redundancy value for the file stored in the system information storage 330 whenever the threshold redundancy value for the file changes. In cases where the file redundancy manager 330 determines the current redundancy value for the file periodically, the processor 325 also may save the current redundancy value for the file in the system information storage 330, with periodic updating of the stored value. Thus, the current redundancy value for the file and/or the threshold redundancy value for the file may be accessed from the system information storage 330 by the processor 325 so that the processor 325 and/or the file redundancy manager 330 may make various determinations such as described herein. Storing such information in the system information storage 330 may make such information available after the data storage system 305 is turned off and restarted. Thus, the current redundancy value for the file and/or the threshold redundancy value for the file may be available upon boot up of the data storage system 305 to continue redundancy management, for example, when the data storage system 305 has not been in use (e.g., powered off) for some time. Although the system information storage 330 is shown as a separate component, it should be understood that the system information storage 330 may be implemented as part of one of the disk drives 310-1 . . . 310-n as well.

Figure 3B:
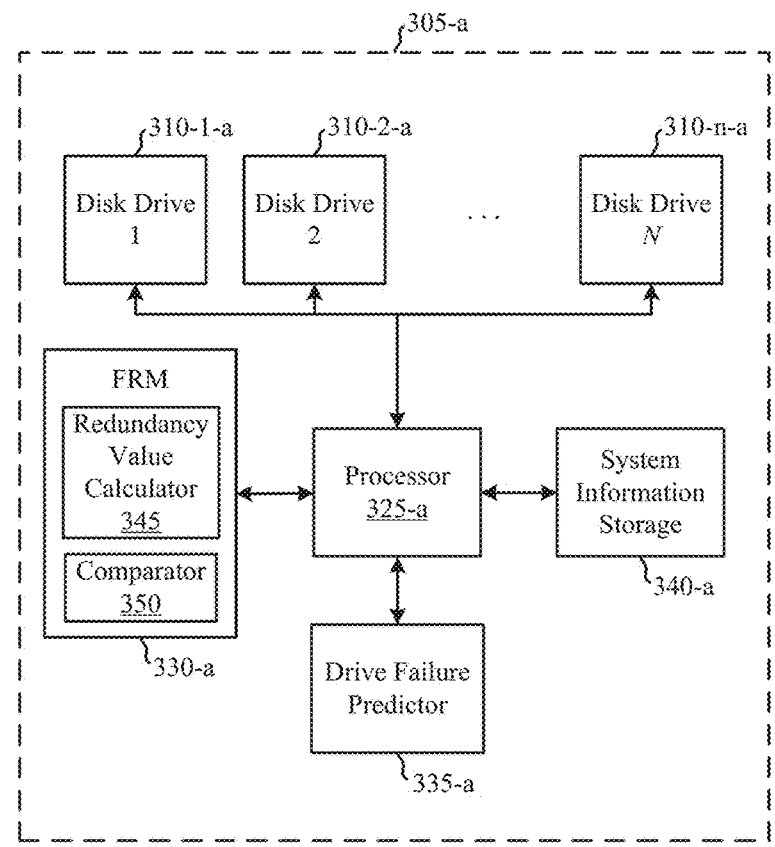
FIG. 3B is a block diagram of another data storage system, in accordance with various embodiments.

FIG. 3B shows a block diagram that illustrates an example of a data storage system 305-a, in accordance with various aspects of the present disclosure. The data storage system 305-a may be an example of the data storage device 105 described above with respect to FIG. 1, the data storage device 205 described above with respect to FIG. 2, or the data storage system 305 described above with respect to FIG. 3A, for example.

The data storage system 305-a may include a plurality (N) of disk drives 310-1-a, 310-2-a . . . 310-n-a (or other data storage devices). The data storage system 305-a also may include a processor 325-a, a file redundancy manager 330-a, a drive failure predictor 335-a and a system information storage 340-a. The processor 325-a, the drive failure predictor 335-a and the system information storage 340-a may be configured as described with respect to FIG. 3A for the similar components, and may provide similar functions.

In the example of FIG. 3B, the file redundancy manager (FRM) 330-a may include a redundancy value calculator 345 and a comparator 350. The redundancy value calculator 345 may be configured to determine a current redundancy value for a file, for example, based on a number of the disk drives 310-1-a . . . 310-n-a having a copy of the file stored thereon and the status (e.g., healthy, failed or predicted to fail) of such drives. As described above, the FRM 330-a may receive such information from the processor 325-a, for example. In some examples, the redundancy value calculator 345 may be configured to determine updates to the threshold redundancy value for a file, for example, based on information (e.g., accesses of the file) received from the processor 325-a.

The comparator 350 of the FRM 330-a may be configured to compare a current redundancy value for a file, determined by the redundancy value calculator 345, with the threshold redundancy value for the file, determined by the redundancy value calculator 345 and/or retrieved from the system information storage 340-a. Based at least in part on a result of the comparison by the comparator 330-a, the FRM 330-a may determine whether a copy of the file should be stored on another healthy storage drive of the disk drives 310-1-a . . . 310-n-a that does not already have a copy of the file stored thereon.

For example, when the drive failure predictor 335-a predicts that one of the disk drives 310-1-a . . . 310-n-a having a copy of the file stored thereon is going to fail, the redundancy value calculator 345 may determine the current redundancy value for the file on a basis of a number of the disk drives 310-1-a . . . 310-n-a that are healthy (e.g., neither failed nor predicted to fail) and have a copy of the file stored thereon. The comparator 350 then may compare the current redundancy value for the file with the (current/updated) threshold redundancy value for the file. If the result of the comparison is that the current redundancy value for the file still satisfies (e.g., equal to or greater than) the threshold redundancy value for the file (e.g., without the copy of the file on the disk drive predicted to fail), the FRM 330-a may determine that no action is to be performed in response to the predicted failure. Otherwise, when the result of the comparison is that the current redundancy value for the file does not satisfy (e.g., is less than) the threshold redundancy value for the file (e.g., without the copy of the file on the disk drive predicted to fail), the FRM 330-a may determine that a copy of the file should be stored on another healthy drive of the disk drives 310-1-a . . . 310-n-a that does not already have a copy of the file stored thereon. Based at least in part on such determination, the processor 325-a then may store a copy of the file on another healthy drive. In some examples, the processor 325-a may store a copy of the file on another healthy drive by moving the copy of the file stored on the drive predicted to fail to a healthy drive.

It should be understood that the various features described above with respect to FIGS. 1, 2, 3A and/or 3B may be combined to achieve other configurations as well. Thus, the examples described above are intended to be illustrative and not exhaustive.

The components of the computing device 210 described with respect to FIG. 2 and those of the data storage systems 305, 305-a described with respect to FIGS. 3A and 3B may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the processor 215 may be a central processing unit (CPU) of the computing device 210. The processor 215 may be configured to control or otherwise cooperate with the data storage device 205 and the I/O interface 220 to carry out various operations of the computing device 210 in connection with the redundancy management features described herein. The processor 215 may also be configured to carry out other functions of the computing device 210 by controlling these and/or other components that may be included in the computing device 210 according to its design.

In some implementations, the processors 325, 325-a may be disk drive controllers of the respective storage systems 305, 305-a. In some cases, the processors 325, 325-a may provide the functions of the respective file redundancy managers 330, 330-a, as well as the respective drive failure predictors 335, 335-a. In some cases, the file redundancy managers 330, 330-a, as well as the drive failure predictors 335, 335-a, may be sub-modules of the respective processors 325, 325-a.

Figure 4:
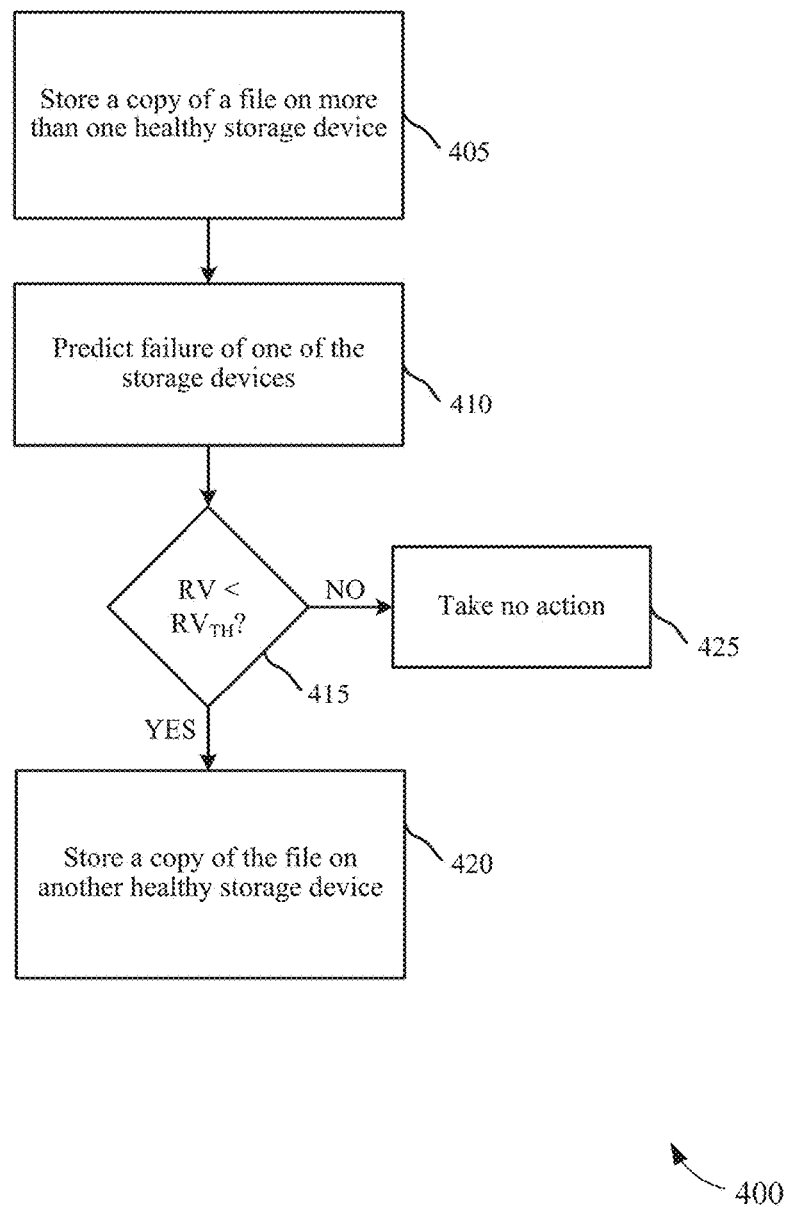
FIG. 4 is a flowchart illustrating an example of a method of redundancy management, in accordance with various embodiments.

FIG. 4 is a flowchart illustrating an example of a method 400 of redundancy management for a data storage system including a plurality of storage devices, in accordance with various aspects of the present disclosure. For clarity, the method 400 is described below with reference to aspects of the data storage system 305 described with reference to FIG. 3A, and/or the data storage system 305-a described with reference to FIG. 3B. In some implementations, a processor of such may execute one or more sets of codes to control the functional elements of the computing device and/or the data storage device/drive to perform the functions described below.

At block 405, a copy of a file is stored on a subset of the plurality of storage devices. The subset may include at least two healthy storage devices of the plurality of storage devices. In other words, a copy of the file is stored on multiple healthy storage devices to achieve a certain level of file redundancy. For example, the number of healthy storage drive on which a copy of the file may be in accordance with a threshold redundancy value for the file (e.g., so that the threshold redundancy value for the file is satisfied).

At block 410, a storage device of the subset may be predicted to fail. As discussed above, such prediction may be performed using any suitable drive failure prediction technology. The storage device may be predicted to fail at some point in the future or within a certain time frame, as appropriate or desired. A particular time frame may be specified, for example, when the drive failure prediction technology employed provides an expected failure time or allows a time frame to be set as a threshold for predicting failure. Limiting failure prediction to a certain time frame may allow the data storage system to more efficiently manage redundancy by addressing impending drive failures sooner rather than treating all predicted drive failures equally, without regard to how much time is available to address the predicted failure.

At block 415, a determination may be made as to whether a current redundancy value (RV) for the file (taking into account the predicted storage device failure, e.g., determined without counting the drive predicted to fail) satisfies a threshold redundancy value ($RV_{TH}$) for the file, such as whether the current RV for the file is less than the $RV_{TH}$ for the file.

Based at least in part on such a determination (e.g., comparison), whether to store a copy of the file on another healthy storage device of the plurality of storage devices of the storage system may be determined. For example, the determination may be made based, either solely or in combination with other factors, on whether a current redundancy value for the file. As shown in FIG. 4, when the current RV for the file does not satisfy (e.g., is less than) the $RV_{TH}$ for the file, the method 400 may continue to block 420, where a copy of the file may be stored on another healthy storage device of the data storage system. Otherwise (e.g., when the current RV for the file still satisfies the $RV_{TH}$ for the file even with the predicted storage device failure), the method may jump to block 425 to take no further action based on the prediction. In such a manner, a redundancy value for a file may be maintained so as to provide a desired level of redundancy (e.g., backup) even with storage device failures.

Figure 5:
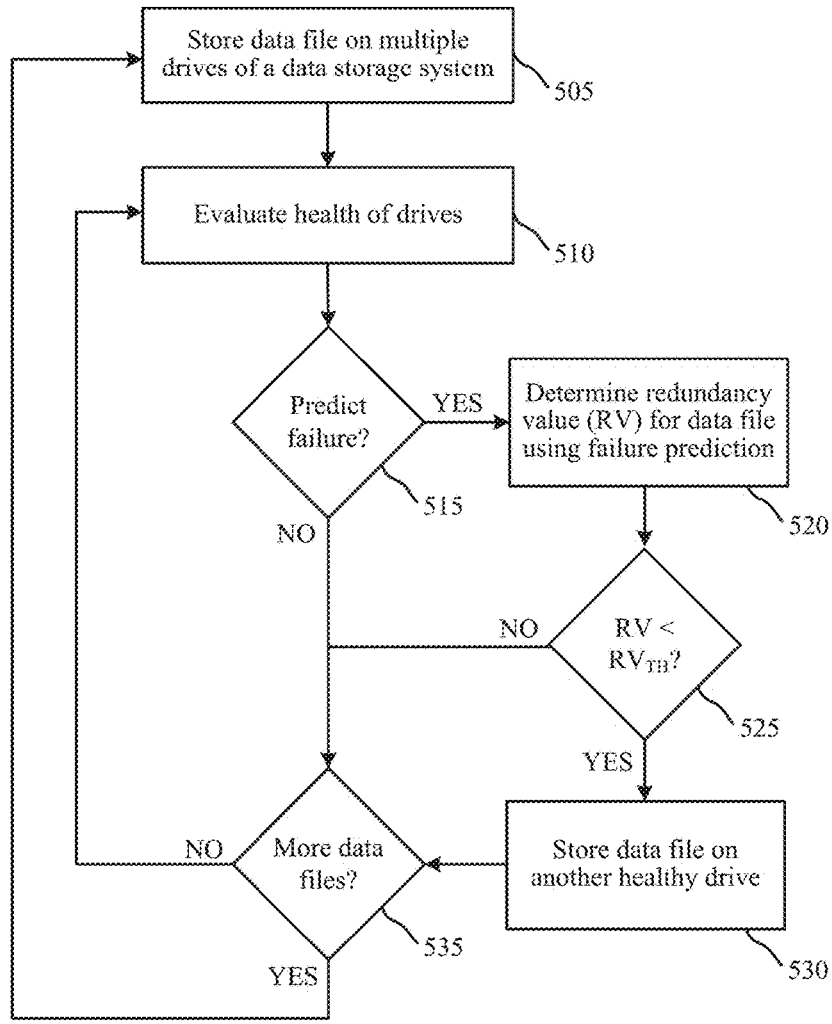
FIG. 5 is a flowchart illustrating another example of a method of redundancy management, in accordance with various embodiments.

FIG. 5 is a flowchart illustrating another example of a method 500 of redundancy management for a data storage system including a plurality of storage devices, in accordance with various aspects of the present disclosure. For clarity, the method 500 is described below with reference to aspects of the data storage system 305 described with reference to FIG. 3A, and/or the data storage system 305-*a* described with reference to FIG. 3B. In some implementations, a processor of such may execute one or more sets of codes to control the functional elements of the computing device and/or the data storage device/drive to perform the functions described below.

At block 505, a first file may be stored in a data storage system by storing a copy of the first file on multiple drives of the storage system to achieve a certain level of redundancy for the file. In some cases, the number of drives on which the first file is initially stored may be determined based on a threshold redundancy value associated with the file, for example, or may be a default number. Although not shown in this example, the method 500 may be designed to adjust the default number to satisfy the threshold redundancy value for the file, and may generate updates to the threshold redundancy value for the file, causing a copy of the file to be stored on one or more additional drives to satisfy the updated threshold redundancy value.

At block 510, the health of the drives of the storage system may be evaluated. Such evaluation may be performed, for example, using a drive failure prediction technology. Thus, at block 515, whether failure of a drive of the storage system is predicted may be determined. If a drive is predicted to fail and that drive has a copy of the first file stored thereon, the method 500 may continue to block 520, where a redundancy value (RV) for the file may be determined using the failure prediction. The RV for the file may be determined as if the drive has already failed, namely, not including the drive predicted to fail for determining the current RV.

Once the current RV has been determined, a further determination may be performed at block 525. The determination at block 525 may be whether the current RV for the first file is sufficient. Such determination may be made in accordance with a threshold redundancy value ($RV_{TH}$) for the first file, for example, by determining whether the current RV is less than the $RV_{TH}$. If the current RV is less than the $RV_{TH}$, the method 500 may continue to block 530, where a copy of the first file may be stored on another healthy drive of the storage system, namely a healthy drive that does not already have a copy of the first file stored thereon.

The method 500 then may continue to block 535, where whether a second file, different from the first file, or an update of the first file is to be stored in the data storage system. If not, the method 500 may return to block 510 to reevaluate the health of the drives (e.g., after a predetermine elapse of time, which may be adjusted, for example, based at least in part on information regarding drive reliability, such as actual drive failures within the storage system). Otherwise, the method may return to block 505.

Upon returning to block 505, the method 500 may continue its process for the second file, such as described above for the first file. Alternatively, if an update of the first file is to be stored, the operations at block 505 may involve replacing the copies of the first file stored on drives of the storage system with the update. Then, the method 500 may continue its process for the updated first file, such as described above.

If no drive is predicted to fail or the drive predicted to fail does not have a copy of the first file stored thereon, the method 500 may jump from block 515 to block 535. Also, if the current RV is equal to or greater than the $RV_{TH}$ at block 525, the method 500 may jump to block 535.

Although not illustrated, the method 500 may include additional operational blocks, such as blocks for monitoring data accesses of files and for updating the threshold redundancy values ($RV_{TH}$s) for files based at least in part on the number and/or frequency of accesses of the respective files. Such features are not shown for the sake of simplicity and clarity of the flowchart.

Figure 6A:
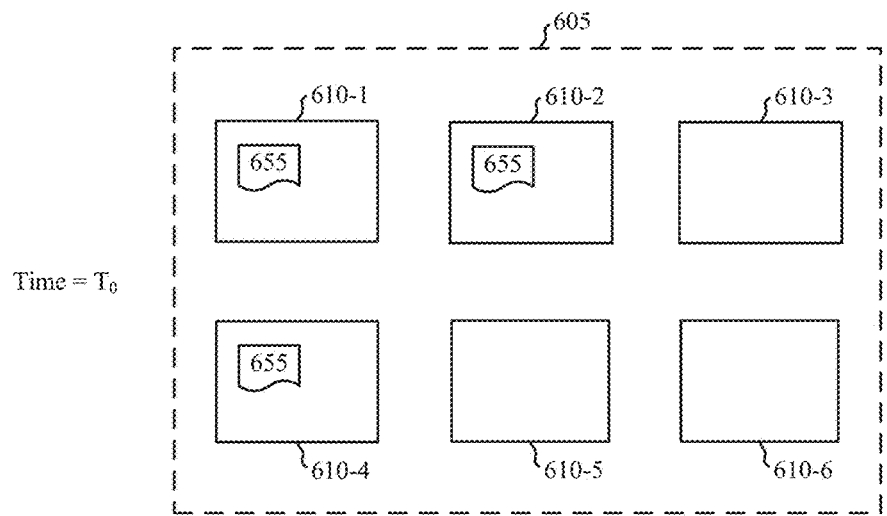
FIGS. 6A-6B show a series of diagrams illustrating an example of redundancy management for a storage system including a plurality of storage devices, in accordance with various embodiments.
Figure 6A:
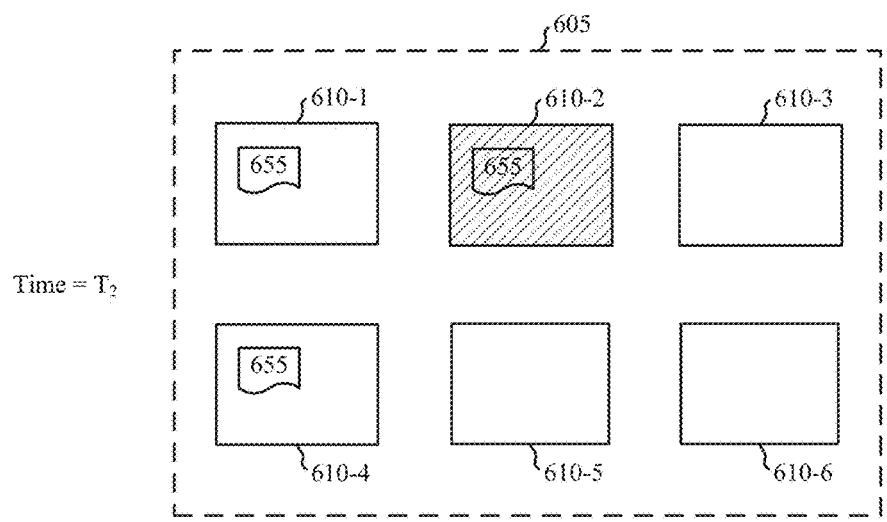
Figure 6B:
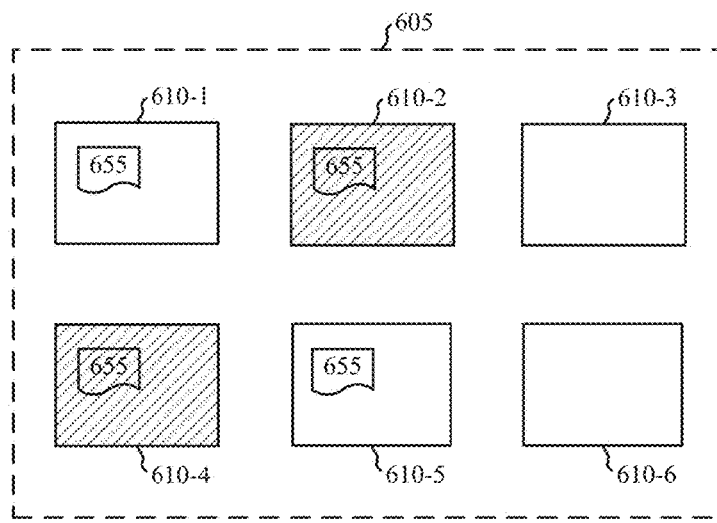

An example of an implementation of redundancy management, in accordance with various aspects of the present disclosure, is illustrated by the series of diagrams in FIGS. 6A-6B. Turning first to FIG. 6A, a data storage system 605 is illustrated having a plurality of storage devices 610-1, 610-2, 610-3, 610-4, 610-5 and 610-6. Although six (6) storage devices are shown, it should be understood that the storage system 605 may include more or fewer of storage devices. At a time $T_0$, storage devices 610-1, 610-2 and 610-4 are shown as storing a copy of a file 655. This may reflect an initial storage of the file 655 in the storage system, for example, based on a certain redundancy level desired for the file 655 (e.g., based at least in part on a threshold redundancy value ($RV_{TH}$) for the file 655).

At a time $T_1$, a determination may be made that storage device 610-2 is going to fail. The predicted failure storage device 610-2 may trigger the storage system to determine a current redundancy value (RV) for the file 655 with the predicted failure (e.g., not counting the storage device 610-2 for determining the current RV). In this case, the determined RV may be two (2), reflecting that a copy of the file 655 is stored on two healthy storage devices 610-1 and 610-4 of the storage system 605. In terms of a fraction or percentage, the determined RV may be thirty-three percent (33%), reflecting that a copy of the file 655 is stored on two healthy storage devices of the total six storage devices of the system 605. As appropriate or desired, the fraction or percentage may be determined without counting any storage devices that are predicted to fail or have already failed; however, doing so may lead to a reduced redundancy level for the file because the current RV determined as such would be higher (e.g., 40% in this example).

Still at time $T_1$, the determined current RV for the file 655 may be compared with the $RV_{TH}$ for the file 655. In this example, the $RV_{TH}$ for the file 655 may be two (2). In terms of a fraction or percentage, the $RV_{TH}$ may be thirty-three percent (33%), although any percentage between 16.7 and 33 would work similarly for this example. Thus, in this example, RV (2 or 33%) is greater than or equal to $RV_{TH}$ (2 or 33%), which means that the $RV_{TH}$ for the file 655 is satisfied even with the predicted failure of storage device 610-2.

The predicted failure of storage device 610-2 is shown by cross-hatching at time $T_2$. Because the $RV_{TH}$ for the file 655 is satisfied still, the data storage system 605 may take no action regarding file 655 as illustrated at time $T_2$. A copy of file 655 is stored on storage devices 610-1, 610-2 and 610-4, as at time $T_0$.

Continuing this example with reference to FIG. 6B, at a time $T_3$, a determination may be made that storage device 610-4 is going to fail. The predicted failure storage device 610-4 may trigger the storage system to determine a current redundancy value (RV) for the file 655 with the predicted failures (e.g., not counting the storage devices 610-2 or 610-4 for determining the current RV). It should be noted that storage device 610-2 may have failed by time $T_3$; however, operation of the storage system 605 would not change with respect to the features described herein. In this example, the determined RV may be one (1), reflecting that a copy of the file 655 is stored on one healthy storage device 610-1 of the storage system 605. In terms of a fraction or percentage, the determined RV may be 16.7%, reflecting that a copy of the file 655 is stored on one healthy storage device of the total six storage devices of the system 605.

Still at time $T_3$, the determined current RV for the file 655 may be compared with the $RV_{TH}$ for the file 655. Thus, in this example, RV (1 or 16.7%) is less than $RV_{TH}$ (2 or 33%), which means that the $RV_{TH}$ for the file 655 is not satisfied with the additional predicted failure of storage device 610-4.

The predicted failure of storage device 610-4 is shown by cross-hatching at time $T_4$. Because the $RV_{TH}$ for the file 655 is no longer satisfied, the data storage system 605 may take action to store a copy of file 655 on another healthy storage device 610-5 as illustrated at time $T_4$. With the addition copy of the file 655 stored on storage device 610-5, the current RV at time $T_4$ is restored to 2 or 33%, thus satisfying the $RV_{TH}$ for file 655 (e.g., the desired redundancy level for file 655 is maintained).

Figure 7:
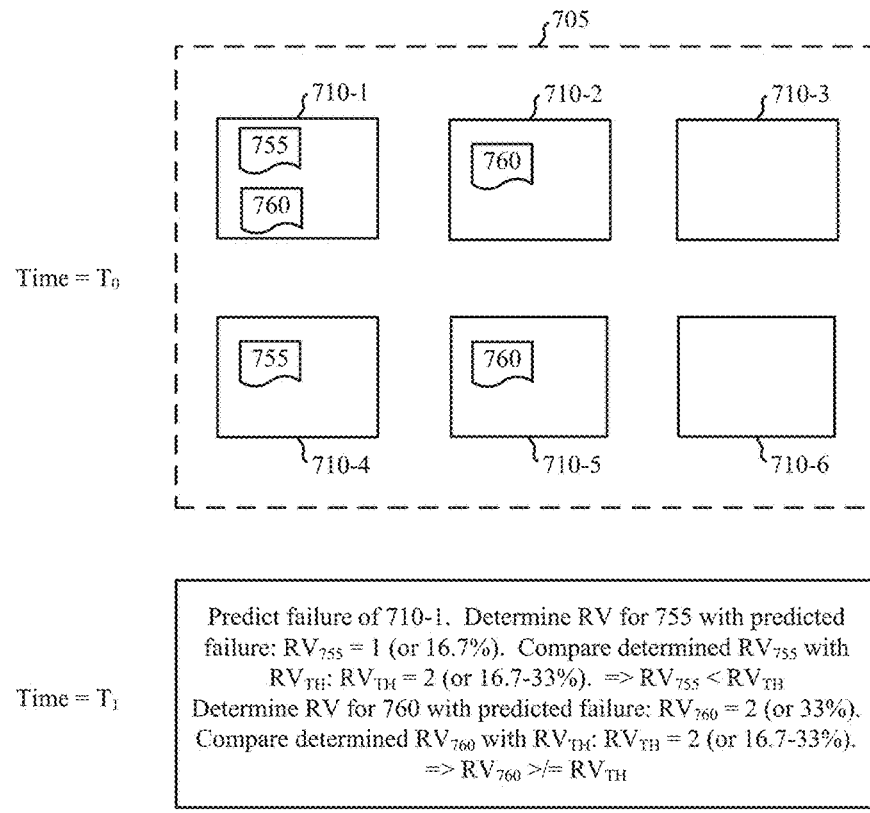
FIG. 7 shows a series of diagrams illustrating another example of redundancy management for a storage system including a plurality of storage devices, in accordance with various embodiments.
Figure 7:
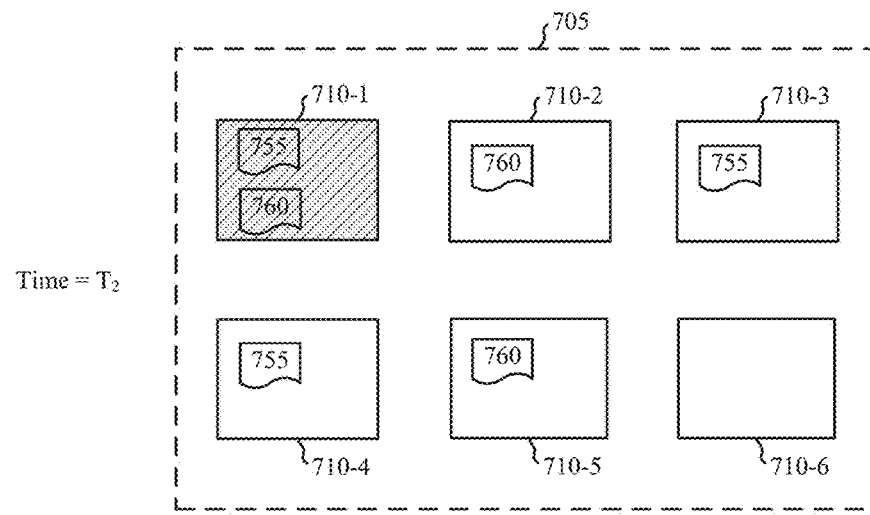

Another example of an implementation of redundancy management, in accordance with various aspects of the present disclosure, is illustrated by the series of diagrams in FIG. 7. A data storage system 705 is illustrated having a plurality of storage devices 710-1, 710-2, 710-3, 710-4, 710-5 and 710-6. Although six (6) storage devices are shown, it should be understood that the storage system 705 may include more or fewer of storage devices. At a time $T_0$, storage devices 710-1 and 710-4 are shown as storing a copy of a file 755, and storage devices 710-1, 710-2 and 710-5 are shown as storing a copy of a file 760.

At a time $T_1$, a determination may be made that storage device 710-1 is going to fail. The predicted failure storage device 710-1 may trigger the storage system to determine a current redundancy value (RV) for the file 755 with the predicted failure (e.g., not counting the storage device 710-1 for determining the current RV). In this case, the determined $RV_{755}$ may be one (1), reflecting that a copy of the file 755 is stored on one healthy storage device 710-4 of the storage system 705. In terms of a fraction or percentage, the determined $RV_{755}$ may be 16.67%. The determined current $RV_{755}$ for the file 755 may be compared with the $RV_{TH}$ for the file 755. In this example, the $RV_{TH}$ for the file 755 may be two (2). In terms of a fraction or percentage, the $RV_{TH}$ may be thirty-three percent (33%), although any percentage between 16.7 and 33 would work similarly for this example. Thus, in this example, $RV_{755}$ (1 or 16.67%) is less than $RV_{TH}$ (2 or 33%), which means that the $RV_{TH}$ for the file 755 is not satisfied with the predicted failure of storage device 710-1.

Still at time $T_1$, the predicted failure storage device 710-1 also may trigger the storage system to determine a current redundancy value (RV) for the file 760 with the predicted failure. In this case, the determined $RV_{760}$ may be two (2), reflecting that a copy of the file 760 is stored on two healthy storage devices 710-2 and 710-5 of the storage system 705. In terms of a fraction or percentage, the determined RV may be 33%. The determined current $RV_{760}$ for the file 760 may be compared with the $RV_{TH}$ for the file 760. In this example, the $RV_{TH}$ for the file 760 also may be two (2), or in terms of a fraction or percentage, a percentage between 16.7 and 33. Thus, in this example, $RV_{760}$ (2 or 33%) is greater than or equal to $RV_{TH}$ (2 or 33%), which means that the $RV_{TH}$ for the file 760 is satisfied even with the predicted failure of storage device 710-1.

The predicted failure of storage device 710-1 is shown by cross-hatching at time $T_2$. Because the $RV_{TH}$ for the file 760 is satisfied still, the data storage system 705 may take no action regarding file 760 as illustrated at time $T_2$. A copy of file 760 is stored on storage devices 710-1, 710-2 and 710-5, as at time $T_0$. Because the $RV_{TH}$ for the file 755 is no longer satisfied, the data storage system 705 may take action to store a copy of file 755 on another healthy storage device 710-3 as illustrated at time $T_2$. With the addition copy of the file 755 stored on storage device 710-3, the current $RV_{755}$ at time $T_2$ is restored to 2 or 33%, thus satisfying the $RV_{TH}$ for file 755 (e.g., the desired redundancy level for file 655 is maintained).

Figure 8A:
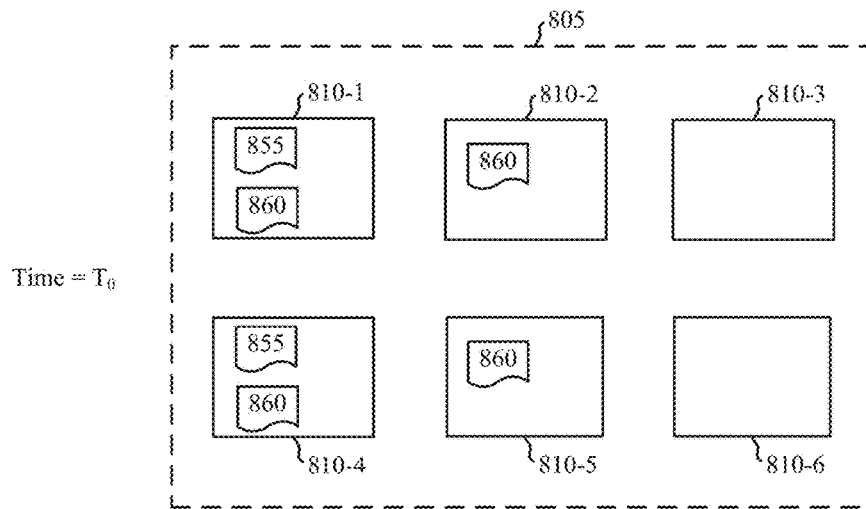
FIGS. 8A-8B show a series of diagrams illustrating yet another example of redundancy management for a storage system including a plurality of storage devices, in accordance with various embodiments.
Figure 8A:
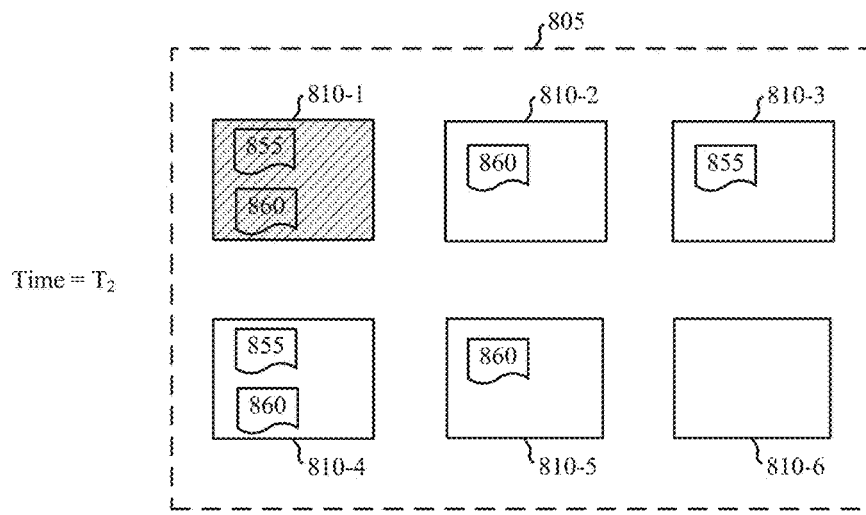
Figure 8B:
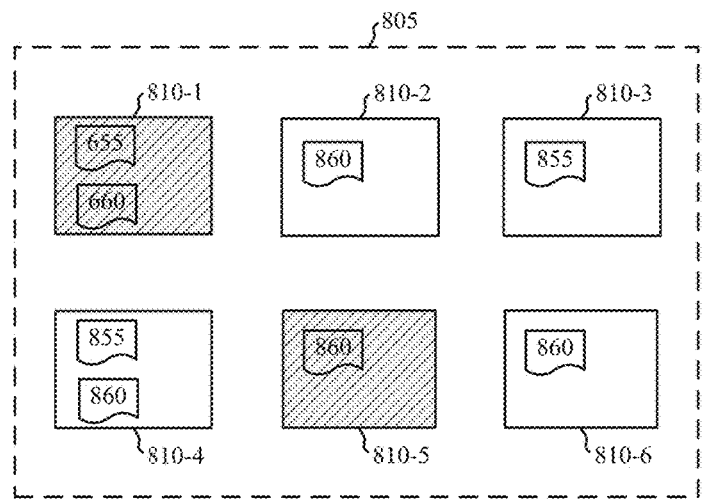

Another example of an implementation of redundancy management, in accordance with various aspects of the present disclosure, is illustrated by the series of diagrams in FIGS. 8A-8B. A data storage system 805 is illustrated having a plurality of storage devices 810-1, 810-2, 810-3, 810-4, 810-5 and 810-6. Although six (6) storage devices are shown, it should be understood that the storage system 805 may include more or fewer of storage devices. At a time $T_0$, storage devices 810-1 and 810-4 are shown as storing a copy of a file 855, and storage devices 810-1, 810-2, 810-4 and 810-5 are shown as storing a copy of a file 860.

At a time $T_1$, a determination may be made that storage device 810-1 is going to fail. The predicted failure storage device 810-1 may trigger the storage system to determine a current redundancy value (RV) for the file 855 with the predicted failure (e.g., not counting the storage device 810-1 for determining the current RV). In this case, the determined $RV_{855}$ may be one (1), reflecting that a copy of the file 855 is stored on one healthy storage device 810-4 of the storage system 805. In terms of a fraction or percentage, the determined $RV_{855}$ may be 16.67%. The determined current $RV_{855}$ for the file 855 may be compared with the $RV_{TH}$ for the file 855. In this example, the $RV_{TH}$ for the file 855 may be two (2). In terms of a fraction or percentage, the $RV_{TH}$ may be thirty-three percent (33%), although any percentage between 16.7 and 33 would work similarly for this example. Thus, in this example, $RV_{855}$ (1 or 16.67%) is less than $RV_{TH}$ (2 or 33%), which means that the $RV_{TH}$ for the file 855 is not satisfied with the predicted failure of storage device 810-1.

Still at time $T_1$, the predicted failure storage device 810-1 also may trigger the storage system to determine a current redundancy value (RV) for the file 860 with the predicted failure. In this case, the determined $RV_{860}$ may be three (3), reflecting that a copy of the file 860 is stored on three healthy storage devices 810-2, 810-4 and 710-5 of the storage system 805. In terms of a fraction or percentage, the determined $RV_{860}$ may be 50%. The determined current $RV_{860}$ for the file 860 may be compared with the $RV_{TH}$ for the file 860. In this example, the $RV_{TH}$ for the file 860 also may be three (3), or in terms of a fraction or percentage, a percentage between 34 and 50. Thus, in this example, $RV_{860}$ (3 or 50%) is greater than or equal to $RV_{TH}$ (3 or 34-50%), which means that the $RV_{TH}$ for the file 860 is satisfied even with the predicted failure of storage device 810-1.

The predicted failure of storage device 810-1 is shown by cross-hatching at time $T_2$. Because the $RV_{TH}$ for the file 860 is satisfied still, the data storage system 705 may take no action regarding file 860 as illustrated at time $T_2$. A copy of file 860 is stored on storage devices 810-1, 810-2, 810-4 and 710-5, as at time $T_0$. Because the $RV_{TH}$ for the file 855 is no longer satisfied, the data storage system 805 may take action to store a copy of file 855 on another healthy storage device 810-3 as illustrated at time $T_2$. With the addition copy of the file 855 stored on storage device 810-3, the current $RV_{855}$ at time $T_2$ is restored to 2 or 33%, thus satisfying the $RV_{TH}$ for file 855 (e.g., the desired redundancy level for file 855 is maintained).

Continuing this example with reference to FIG. 8B, at a time $T_3$, a determination may be made that storage device 810-5 is going to fail. The predicted failure storage device 810-5 may trigger the storage system to determine a current redundancy value (RV) for the file 860 with the predicted failures (e.g., not counting the storage devices 810-1 or 810-5 for determining the current RV). It should be noted that storage device 610-1 may have failed by time $T_3$; however, operation of the storage system 805 would not change with respect to the features described herein. In this example, the determined $RV_{860}$ may be two (2), reflecting that a copy of the file 860 is stored on two healthy storage devices 610-2 and 610-4 of the storage system 805. In terms of a fraction or percentage, the determined $RV_{860}$ may be 33%, reflecting that a copy of the file 855 is stored on two healthy storage devices of the total six storage devices of the system 805.

Still at time $T_3$, the determined current $RV_{860}$ for the file 860 may be compared with the $RV_{TH}$ for the file 860. Thus, in this example, $RV_{860}$ (2 or 33%) is less than $RV_{TH}$ (3 or 34-50%), which means that the $RV_{TH}$ for the file 860 is not satisfied with the additional predicted failure of storage device 810-5.

The predicted failure of storage device 810-5 is shown by cross-hatching at time $T_4$. Because the $RV_{TH}$ for the file 860 is no longer satisfied, the data storage system 805 may take action to store a copy of file 860 on another healthy storage device 810-6 as illustrated at time $T_4$. With the addition copy of the file 860 stored on storage device 810-6, the current $RV_{860}$ at time $T_4$ is restored to 3 or 50%, thus satisfying the $RV_{TH}$ for file 860 (e.g., the desired redundancy level for file 860 is maintained).

Although not shown for the sake of brevity, an alternative to the prediction of failure of storage device 810-5 is that storage device 810-4 may be predicted at time $T_3$. In such case, the data storage system 805 may take action to store a copy of file 860 on another healthy storage device 810-6 as discussed above. However, the data storage system 805 also may take action to store a copy of file 855 on another healthy storage device, such as 810-6 or 810-2. Thus, copies of the 855 and 860 files may be stored on a same healthy storage device or different healthy storage devices.

The foregoing description of implementations of redundancy management shown in FIGS. 6A-8B are meant to illustrate various permutations, but are not exhaustive. Thus, other implementations of the approaches described herein are possible. Further, although the foregoing implementations illustrate the operations of storing a copy of a file on another healthy storage device of the storage system in terms of storing a new copy of the file, it should be understood that, in some cases, such operations may involve moving the copy from the storage device predicted to fail to a healthy storage device of the storage system.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program or a data file from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method, comprising:

grouping a plurality of files into a group of files based at least in part on the plurality of files having a common level of importance;

storing a copy of the group of files on a subset of a plurality of storage devices, the subset including at least two healthy storage devices of the plurality of storage devices;

evaluating at least the subset of the plurality of storage devices;

identifying each healthy storage device among the subset based at least in part on the evaluating;

predicting that a storage device of the subset is going to fail based at least in part on the evaluating;

determining a redundancy value for the group of files based at least in part on a number of healthy storage devices in the subset storing the copy of the group of files, a file importance level, and a predicted-to-fail storage device reliability of the storage device that is predicted to fail;

based at least in part on the redundancy value for the group of files, determining whether to store a copy of at least a portion of the group of files on another healthy storage device of the plurality of storage devices; and upon determining to store the copy of at least a portion of the group of files on another healthy storage device, moving the copy of at least portion of the group of files stored on the storage device predicted to fail to at least one of the healthy storage devices identified based at least in part on the evaluating.

2. The method of claim 1, further comprising:

comparing the determined redundancy value for the group of files with a threshold redundancy value;

wherein determining whether to store the copy of at least a portion of the group of files on another healthy storage device of the plurality of storage devices is based at least in part on a result of the comparison.

3. The method of claim 2, further comprising:

when the result of the comparison is that the determined redundancy value for the group of files is less than the threshold redundancy value, storing the copy of at least a portion of the group of files on another healthy storage device of the plurality of storage devices.

4. The method of claim 1, wherein:

storing the copy of at least a portion of the group of files on a subset of the plurality of storage devices comprises storing a copy of a first file on a first subset of the plurality of storage devices and storing a copy of a second file on a second subset of the plurality of storage devices, each of the subsets including at least two healthy storage devices of the plurality of storage devices;

predicting that a storage device of the subset is going to fail comprises predicting that a storage device of at least one of the subsets is going to fail; and determining whether to store the copy of at least a portion of the group of files on another healthy storage device of the plurality of storage devices comprises determining whether to store a copy of the file(s) on another healthy storage device of the plurality of storage devices, based at least in part on a redundancy value for the file(s).

5. The method of claim 4, further comprising:
  determining a first redundancy value for the first file based at least in part on a number of copies of the first file stored on healthy storage devices of the plurality of storage devices; and
  determining a second redundancy value for the second file based at least in part on a number of copies of the second file stored on healthy storage devices of the plurality of storage devices.

6. The method of claim 5, wherein the determined first redundancy value is different from the determined second redundancy value.

7. The method of claim 5, further comprising:
  comparing the determined first redundancy value with a first threshold redundancy value; and
  comparing the determined second redundancy value with a second threshold redundancy value;
  wherein determining whether to store a copy of the first file on another healthy storage device of the plurality of storage devices is based at least in part on a result of the comparison of the determined first redundancy value, and determining whether to store a copy of the second file on another healthy storage device of the plurality of storage devices is based at least in part on a result of the comparison of the determined second redundancy value.

8. The method of claim7, wherein the first threshold redundancy value is different from the second threshold redundancy value.

9. The method of claim 7, further comprising:
  when the result of the comparison of the determined first redundancy value is that the determined first redundancy value is less than the first threshold redundancy value, storing a copy of the first file on another healthy storage device of the plurality of storage devices; and
  when the result of the comparison of the determined second redundancy value is that the determined second redundancy value is less than the second threshold redundancy value, storing a copy of the second file on another healthy storage device of the plurality of storage devices.

10. A system, comprising:
  a data storage system including a plurality of storage devices; and
  at least one processor configured to:
    group a plurality of files into a group of files based at least in part on the plurality of files having a common level of importance;
    store a copy of the group of files on a subset of the plurality of storage devices, the subset including at least two healthy storage devices of the plurality of storage devices;
    evaluate at least the subset of the plurality of storage devices;
    identify each healthy storage device among the subset based at least in part on the evaluating;
    predict that a storage device of the subset is going to fail based at least in part on the evaluating;
    determine a redundancy value for the group of files based at least in part on a number of healthy storage devices in the subset storing the a copy of the group of files, a file importance level, and a predicted-to-fail storage device reliability of the storage device that is predicted to fail;
    determine whether to store a copy of at least a portion of the group of files on another healthy storage device of the plurality of storage devices based at least in part on the redundancy value for the group of files; and
    upon determining to store a copy of the group of files on another healthy storage device, move the copy of the at least portion of the group of files stored on the storage device predicted to fail to at least one of the healthy storage devices identified based at least in part on the evaluating.

11. The system of claim 10, wherein the processor is configured to compare the redundancy value for the file with a threshold redundancy value, and to determine whether to store the copy of at least a portion of the group of files on another healthy storage device of the plurality of storage devices based at least in part on a result of the comparison.

12. The system of claim 11, wherein the processor is configured to store the copy of at least a portion of the group of files on another healthy storage device of the plurality of storage devices when the result of the comparison is that the redundancy value for the group of files is less than the threshold redundancy value.

13. A non-transitory computer-readable medium storing computer-executable code for redundancy management, the code executable by a processor to cause a device to:
  group a plurality of files into a group of files based at least in part on the plurality of files having a common level of importance;
  store a copy of the group of files on a subset of a plurality of storage devices of a storage system, the subset including at least two healthy storage devices of the plurality of storage devices;
  evaluate at least the subset of the plurality of storage devices;
  identify each healthy storage device among the subset based at least in part on the evaluating;
  predict that a storage device of the subset is going to fail based at least in part on the evaluating;
  determine a redundancy value for the group of files based at least in part on a number of healthy storage devices in the subset storing a copy of at least a portion of the group of files, a file importance level, and a predicted-to-fail storage device reliability of the storage device that is predicted to fail;
  compare the determined redundancy value to a threshold redundancy value; and
  based at least in part on the comparing, store the copy of the group of files on a healthy storage device of the plurality of storage devices that does not have the copy of the at least the portion of the group of files stored thereon and identified based at least in part on the evaluating.

14. The medium of claim 13, wherein the code is executable by the processor to cause the device to predict that a storage device of the subset is going to fail by:
  monitoring operation of the storage devices of the subset; and
  evaluating performance of the storage devices of the subset based at least in part on data obtained from monitoring.

* * * * *